United States Patent
Song

(10) Patent No.: US 8,954,977 B2
(45) Date of Patent: Feb. 10, 2015

(54) SOFTWARE-BASED THREAD REMAPPING FOR POWER SAVINGS

(75) Inventor: Justin J. Song, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 925 days.

(21) Appl. No.: 12/316,014

(22) Filed: Dec. 9, 2008

(65) Prior Publication Data

US 2010/0146513 A1 Jun. 10, 2010

(51) Int. Cl.
*G06F 9/00* (2006.01)
*G06F 9/50* (2006.01)
*G06F 1/32* (2006.01)

(52) U.S. Cl.
CPC ............ *G06F 9/5088* (2013.01); *G06F 1/3203* (2013.01); *G06F 1/329* (2013.01); *G06F 9/5094* (2013.01); *Y02B 60/142* (2013.01); *Y02B 60/144* (2013.01); *Y02B 60/162* (2013.01); *Y02B 60/32* (2013.01)
USPC ........................................................ 718/104

(58) Field of Classification Search
CPC .............................. G06F 1/329; G05F 3/1221
USPC ........................................................ 718/102
See application file for complete search history.

(56) References Cited

U.S. PATENT DOCUMENTS

| | | | |
|---|---|---|---|
| 2004/0003300 A1* | 1/2004 | Malueg et al. | 713/300 |
| 2005/0060590 A1 | 3/2005 | Bradley et al. | |
| 2007/0271475 A1 | 11/2007 | Hatasaki et al. | |
| 2008/0250260 A1 | 10/2008 | Tomita | |

OTHER PUBLICATIONS

"Chip Multiprocessing Aware Linux Kernel Scheduler", Suresh Shiddha, et. al, Proceedings of the Linux Symposium vol. II, pp. 201-212, Jul. 20-23, 2005, Ottawa, Canada.
Pending U.S. Appl. No. 12/001,159, filed Dec. 10, 2007.
Pending U.S. Appl. No. 12/001,186, filed Dec. 10, 2007.
Pending U.S. Appl. No. 12/214,523, filed Jun. 19, 2008.
"The State of ACPI in the Linux Kernel", A. Leonard Brown, Proceedings of the Linux Symposium, Jul. 21-24, 2004, Ottawa, Canada, Section 5.3 "C-states" p. 127.
"ACPI 3.0: Supporting Advanced Platform Configuration and Power Management", Guy Therien, Intel Developer's Forum 2004, fall 2004, Slides 24-27.
Advanced Configuration and Power Interface (ACPI) standard, Rev. 3.0b, published Oct. 10, 2006, ACPI Specification 3.0b: Section 8.1 processor power states, Section 8.3 power, performance and throttling state dependencies, Section 8.4.2.1_CST (C states), Section 8.4.2.2_CSD (C-state dependency).
Office Action mailed May 28, 2013 for Chinese Application No. 200910258390.1, 11 pages.

(Continued)

*Primary Examiner* — Robert Fennema
(74) *Attorney, Agent, or Firm* — Schwabe Williamson & Wyatt PC

(57) ABSTRACT

On a multi-core processor that supports simultaneous multi-threading, the power state for each logical processor is tracked. Upon indication that a logical processor is ready to transition into a deep low power state, software remapping (e.g., thread-hopping) may be performed. Accordingly, if multiple logical processors, on different cores, are in a low-power state, they are re-mapped to same core and the core is then placed into a low power state. Other embodiments are described and claimed.

16 Claims, 7 Drawing Sheets

(56) References Cited

OTHER PUBLICATIONS

European Search Report mailed Jun. 5, 2013 for European Application No. 09252700.1, 3 pages.
Office Action mailed Jun. 28, 2013 for European Application No. 09252700.1, 6 pages.
Suresh Siddha et al., "Chip Multi Processing aware Linux Kernel Scheduler", Dec. 31, 2006, 14 pages.
Office Action mailed Feb. 8, 2014 for Chinese Application No. 200910258390.1, 10 pages.
Office Action mailed Aug. 18, 2014 for Chinese Application No. 200910258390.1, 10 pages.

* cited by examiner

SOFTWARE-BASED THREAD REMAPPING FOR POWER SAVINGS

BACKGROUND

Power and thermal management are becoming more challenging than ever before in all segments of computer-based systems. While in the server domain it is the cost of electricity that drives the need for low power systems, in mobile systems battery life and thermal limitations make these issues relevant. Managing a computer-based system for maximum performance at minimum power consumption may be accomplished by reducing power to all or part of the computing system when inactive or otherwise not needed.

One power management standard for computers is the Advanced Configuration and Power Interface (ACPI) standard, e.g., Rev. 3.0b, published Oct. 10, 2006, which defines an interface that allows the operating system (OS) to control hardware elements. Many modern operating systems use the ACPI standard to perform power and thermal management for computing systems. An ACPI implementation allows a core to be in different power-saving states (also termed low power or idle states) generally referred to as so-called C1 to Cn states.

When the core is active, it runs at a so-called C0 state, but when the core is idle, the OS tries to maintain a balance between the amount of power it can save and the overhead of entering and exiting to/from a given state. Thus, C1 represents the low power state that has the least power savings but can be switched on and off almost immediately (thus referred to as a "shallow low power" or "shallow idle" state), while deep low power states (e.g., C3, C6 or C7) represent a power state where the static power consumption may be negligible, depending on silicon implementation, but the time to enter into this state and respond to activity (i.e., back to active C0) is relatively long. Note that different processors may include differing numbers of core C-states, each mapping to one ACPI C-state. That is, multiple core C-states can map to the same ACPI C-state.

Current OS C-state policy may not provide the most efficient performance results because current OS C-state policy may not consider activities of other cores in the same package. In particular, current OS C-state policy may fail to take advantage of efficiencies that could be gained by more closely tracking and managing the power states of various threads running on different cores of the same package. That is, one hardware thread of a core may be in a deep low power state while another hardware thread of the core may be active. According to current OS C-state policy, a core cannot enter a deep low power state unless all threads on the core are in a deep low power state. If multiple cores experience this condition, then none of the cores can go into a deep low power state (even if multiple hardware threads are inactive).

DETAILED DESCRIPTION

Embodiments accurately and in real time perform software-based logical remapping of threads to cores, effectively "exchanging" idle threads to the same core so that the core may enter a low-power state. More specifically, an operating system may perform a logical remapping and task pulling to pull tasks from one hardware thread context on one core to another hardware thread context on a different core. If a hardware thread context is ready to transition into a low-power state, the operating system may then determine if any other thread contexts in the package are also in a low-power state. The operating system may then perform a software-based logical remapping to swap one or more of the low-power thread contexts to the same core as the first low-power thread and, if appropriate, swap an active thread from that core to another core. When swapping has been completed such that all thread contexts mapped to a particular core are in a low power state, the core itself may be placed in a low power state. As used herein, the term "thread" refers to a software thread. The terms "logical CPU", "logical processor", "hardware thread context", and "thread unit" are used interchangeably herein to refer to a hardware thread context on which a software thread may be executed. At least one embodiment of a hardware thread context is described in further detail below in connection with FIG. 2 (see discussion of $LP_0$ and $LP_1$). For such embodiment, a thread unit may comprise a portion of a core—for example, an SMT (simultaneous multi-threading) logical processor of a multi-threaded SMT core. For other embodiments, however, a thread unit may comprise, for example, an entire single-threaded core.

For at least one embodiment, embodiments of the swap scheme discussed herein may be used in conjunction with existing OS mechanisms in order to achieve scheduling of tasks on those cores for which the least cost (in terms of power and/or time) will be incurred. Embodiments may be deployed in OS kernel code in conjunction with OS C-state and scheduling policy. Alternatively, one or more embodiments may be deployed in platform firmware with an interface to OS C-state policy and scheduling mechanisms.

Note that the processor core C-states described herein are for an example processor such as those based on IA-32 architecture and IA-64 architecture, available from Intel Corporation, Santa Clara, Calif., although embodiments can equally be used with other processors. Shown in Table 1 below is an example designation of core C-states available in one embodiment, and Table 2 maps these core C-states to the corresponding ACPI states. However, it is to be understood that the scope of the present invention is not limited in this regard.

Figure 1:
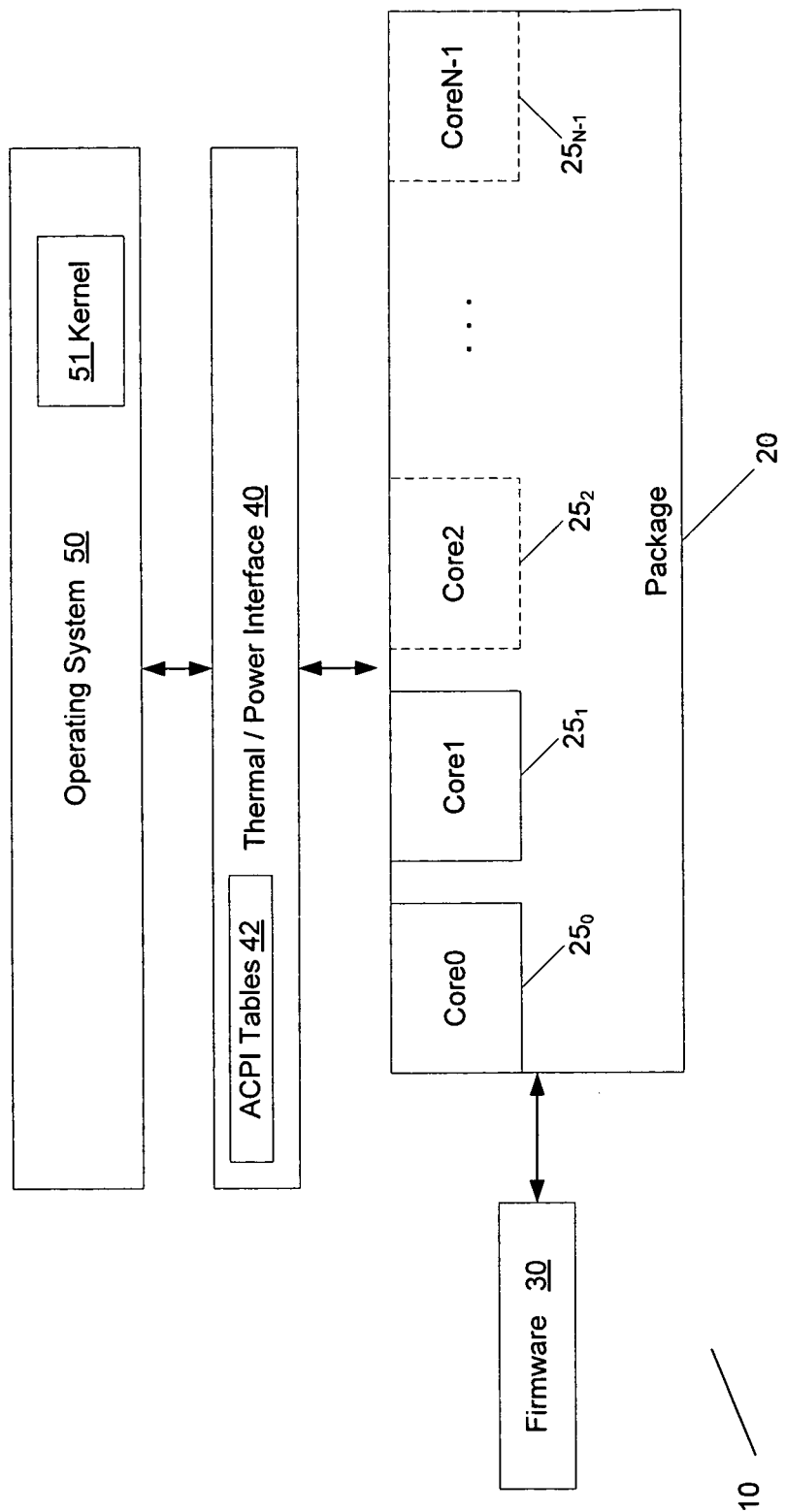
FIG. 1 is a block diagram illustrating at least one embodiment of a system to perform disclosed techniques.

Referring now to FIG. 1, shown is a block diagram of a system 10 that employs a swapping mechanism to migrate threads from one logical processor on one core to a different logical processor on a different core, based on power state information, in accordance with at least one embodiment. As shown in FIG. 1, system 10 includes a processor package 20 having a plurality of processor cores $25_0$-$25_{n-1}$ (generically core 25). The number of cores may vary in different implementations, from dual-core packages to many-core packages including potentially large numbers of cores. The optional nature of additional cores is denoted in FIG. 1 by broken lines. Each core 25 may include various logic and control structures to perform operations on data responsive to instructions. Although only one package 20 is illustrated, the described methods and mechanisms may be employed by computing systems that include multiple packages as well.

For at least one embodiment, one or more of the cores 25 may support multiple hardware thread contexts per core. (See, e.g., system 250 of FIG. 2, in which each core 252 supports two hardware thread contexts per core.) Such embodiment should not be taken to be limiting, in that one of skill in the art will understand that each core may support more than two hardware thread contexts.

FIG. 1 illustrates that a computing system 10 may include additional elements. For example, in addition to the package hardware 20 the system 10 may also include a firmware layer 30, which may include a BIOS (Basic Input-Output System). The computing system 10 may also include a thermal and power interface 40. For at least one embodiment, the thermal and power interface 40 is a hardware/software interface such as that defined by the Advanced Configuration and Power Interface (ACPI) standard, e.g., Rev. 3.0b, published Oct. 10, 2006, mentioned above. The ACPI specification describes platform registers, ACPI tables, e.g., 42, and the operation of an ACPI BIOS. FIG. 1 shows these collective ACPI components logically as a layer between the package hardware 20 and firmware 30, on the one hand, and an operating system ("OS") 50 on the other.

The operating system 50 of FIG. 1 may be configured to interact with the thermal and power interface 40 in order to direct power management for the package 20. Accordingly, FIG. 1 illustrates a system 10 capable of using an ACPI interface 40 to perform Operating System-directed configuration and Power Management (OSPM).

The operating system 50 may thus include logic (software, firmware, hardware, or combination) to perform the OSPM function. For at least one embodiment, an OSPM logic module may be system code that is part of the OS kernel 51. The OS kernel 51 may also include a scheduling logic module (not shown).

The OS 50 may also include an APCI driver (not shown) that establishes the link between the operating system or application and the PC hardware. The driver may enable calls for certain ACPI-BIOS functions, access to the ACPI registers and the reading of the ACPI tables 42.

For purposes of example, Table 1 below shows core C-states and their descriptions, along with the estimated power consumption and exit latencies for these states, with reference to an example processor having a thermal design power (TDP) of 95 watts (W). Of course it is to be understood that this is an example only, and that embodiments are not limited in this regard. Table 1 also shows package C-states and their descriptions, estimated exit latency, and estimated power consumption.

TABLE 1

|  | Description | Estimated Exit Latency | Estimated power consumption |
| --- | --- | --- | --- |
| Core C0 | All core logics active | N/A | 4.9 W |
| Core C1 | Core clockgated | 2 μs | 2.4 W |
| Core C3 | Core multi-level cache (MLC) flushed and invalidated | 10-20 μs | 1.7 W |
| Core C6 | Core powergated | 20-40 μs | 0 W |

TABLE 1-continued

|  | Description | Estimated Exit Latency | Estimated power consumption |
| --- | --- | --- | --- |
| Core C7 | Core powergated and signals "package (pkg) last level cache (LLC) OK-to-shrink" | 20-40 μs | 0 W |
| Pkg C0 | All uncore and core logics active | N/A | 95 W |
| Pkg C1 | All cores inactive, pkg clockgated | 2-5 μs | 29 W |
| Pkg C3 | Pkg C1 + all external links to long-latency idle states + put memory in short-latency inactive state | ~50 μs | 21 W |
| Pkg C6 | Pkg C3 + reduced voltage for powerplane (only very low retention voltage remains) + put memory in long-latency inactive state | ~80 μs | 6 W |
| Pkg C7 | Pkg C6 + LLC shrunk | ~100 μs | 4 W |

Table 1 illustrates that Core C0 and Core C1 C-states are relatively low-latency power states, while the deep C-states (e.g., Core C3, Core C6 and Core C7) are high-latency states. Each SMT thread unit (or "logical processor") of a core may also be associated with one of the C-states illustrated in Table 1. The C-state associated with a logical processor may be referred to herein as "thread C-state".

Table 2 shows an example mapping of core C-states of an example processor to the ACPI C-states. Again it is noted that this mapping is for example only and that embodiments are not limited in this regard.

TABLE 2

Core C0→ACPI C0
Core C1→ACPI C1
Core C3→ACPI C1 or C2
Core C6→ACPI C2 or C3
Core C7→ACPI C3

It is to be noted that package C-states are not supported by ACPI; therefore, no ACPI mappings are provided in Table 2 for package C-states listed above in Table 1.

Figure 2:
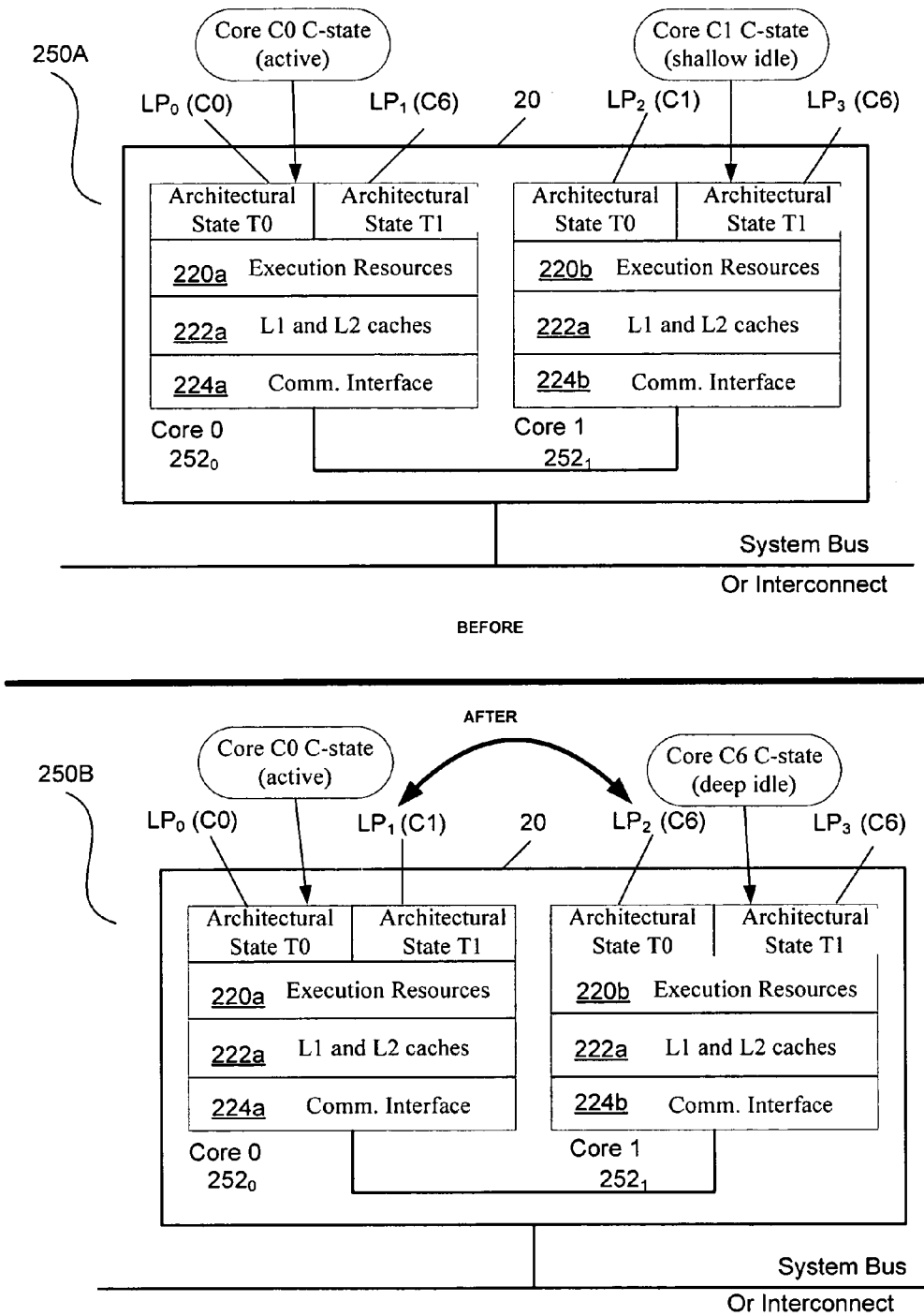
FIG. 2 is a block data flow diagram representing before and after views of a remapping example according to at least one embodiment.

We now turn to FIG. 2 for a brief discussion to illustrate the power inefficiencies that may occur when the OS kernel (see 51 of FIG. 1) performs known techniques that do not provide for migrating low-power threads to the same core.

FIG. 2 illustrates a system 250 with a package 20 that includes two cores, $252_0$ and $252_1$. Of course, while the package 20 illustrates only two cores, this simplification is for ease of illustration only. One of skill in the art will recognize that a package 20 may include any number of cores without departing from the scope of the embodiments described and claimed herein.

The cores $252_0$ and $252_1$ shown in FIG. 2 are multi-threaded cores. That is, FIG. 2 illustrates that each core 252 is a dual-threaded simultaneous multithreading ("SMT") core, where each core 252 maintains a separate architectural state ($T_0$, $T_1$) for each of two hardware thread contexts $LP_0$, $LP_1$, but where certain other resources 220, 222, 224 are shared by the two hardware thread contexts $LP_0$, $LP_1$. As is mentioned above, for such embodiment each hardware thread context LP (or "logical CPU" or "logical processor") may have a separate C-state.

If a hardware thread context is permitted to transition into a deep thread C-state without taking into account total thread and core C-state for the package 20, both power and performance inefficiencies may be incurred. This drawback is illustrated in the "Before" example of system 250A in FIG. 2. For purposes of example, assume that hardware thread $LP_0$ of Core 0, $252_0$, is in an active C-state (e.g., C0) but that hardware thread $LP_1$ of Core 0, $252_0$, is in a deep core C-state (e.g., C6). According to current C-state policy, core C0 $252_0$ cannot enter a deep core C-state because one of its hardware threads $LP_0$ is not in a deep thread C-state. As mentioned above, current C-state policy prescribes that a core can only enter a deep core C-state if all hardware contexts for that core are in a deep thread C-state.

FIG. 2 illustrates a similar situation with Core 1, $252_1$ in the "Before" example Assume that one hardware thread $LP_2$ of Core 1, $252_1$, is in a shallow thread C-state (e.g., C1) and that the other hardware thread $LP_3$ of core 1, $252_1$, is in a deep thread C-state (e.g., C6). Accordingly, Core 1 $252_1$ cannot enter a deep core C-state because one of its hardware threads $LP_0$ is not in a deep thread C-state.

In the "Before" example illustrated in FIG. 2, each core has n thread contexts and there are a total of n thread contexts in a deep thread C-state. However, none of the cores can enter a deep core C-state due to the policy requirement that no core can enter a deep core C-state unless all the SMT thread contexts on the core are in a deep thread C-state.

Consulting Table 1, one can see that the example shown for system 250A in FIG. 2 leads to unnecessary power consumption. Table 1 illustrates that a core in C-6 power state utilizes roughly zero watts (0 W). Thus, efficient use of the Core C-6 power state can provide significant power benefits. However, as FIG. 2 illustrates, there are two SMT thread contexts, LP1 and LP3, in a deep thread C-state for the package 20. Because these thread contexts are on different cores, neither of cores, Core 0 $252_0$ or Core 1, $252_1$, can enter a deep core C-state. That is, Core 0 $252_0$ is in core C0 state because one of its hardware thread contexts, $LP_0$, is in an active thread C-state (e.g., C0). Thus, the power consumption of Core 0 $252_0$ is 4.9 W. Similarly, Core 1 $252_1$ cannot enter a deep core C-state because one of its hardware thread contexts, $LP_0$, is in a shallow idle thread C-state (C1). Core 1 252 is in Core C1 state. Thus, the power consumption of Core 1 $252_1$ is 2.4 W. Total power consumption for the system 250A in the "Before" example of FIG. 2 is 4.9+2.4=7.3 W.

The "After" example system 250B of FIG. 2 illustrates that these power inefficiencies may be avoided by a software-based remapping of software threads to hardware thread contexts according to at least one embodiment of the present invention. This remapping capitalizes on the power benefit of the core C-6 state by mapping n (in this case, n=2) hardware threads onto the same n-way SMT-threaded core, where all n threads are in thread C-6 state.

The "After" example of FIG. 2 illustrates that a re-mapping may be performed, according to at least one embodiment of the invention, in order to achieve a software thread exchange among hardware thread contexts. FIG. 2 shows that, on the system 250B, the software thread from $LP_1$ has been remapped to $LP_2$, and vice versa. Thus, in the "After" example, both hardware thread contexts $LP_0$ and $LP_1$ of Core 0 of system 250B are in the C6 state. Accordingly, Core 0 $252_0$ has been placed in the much more energy-efficient core C6 C-state. In contrast, both threads that are in shallow states have been mapped to the hardware thread contexts of Core 1 $252_1$. Thus, Core 1 $252_1$ is in the active C0 C-state. The power usage of the two cores $252_0$ and $252_1$ of the system 250B are: 4.9 W+0 W=4.9 W. Accordingly the difference in power usage between the cores of the "Before" system 250A and the "After" system 250B is 7.3 W−4.9 W=2.4 W. This represents a 33% power savings due to the swap.

It should be noted that the swap illustrated in FIG. 2 is performed in software and allows a swap of a subset of threads from a multi-threaded SMT core. In contrast, current hardware-based core-hopping schemes copy all state for a first core to another core. This is done, in some instances, to balance load or even out hot spots on the core. Such hardware-based core-hopping approaches may be used to switch work from one single-threaded core to another, or to switch all work for all threads from one multi-threaded core to another multi-threaded core. However, such hardware-based core-hopping approaches are relatively gross mechanisms that do not allow for finer-grained mapping of a subset of threads from one core to another. A problem that must be resolved when swapping a subset of threads from one core to another is the very complex task of "untangling" shared resources (see, e.g., shared execution resources 220 and shared caches 222 of FIG. 2) so that thread-specific hardware state may be transferred to the new core. Such operation can be prohibitively complex in known hardware-based core-hopping schemes. Another drawback of hardware-based core-hopping is that known approaches transfer thread execution from one core to another only when the hardware has become idle. The time it takes to wait for hardware resources to become idle can result in wasted opportunity to save power.

To resolve these and other difficulties with hardware-based core-hopping, the inventor has conceived a software approach, referred to herein as "thread-hopping". The approach is a software-based remapping approach that remaps threads among the logical processors of different cores in a package in order to achieve power savings.

The thread-hopping embodiments described herein can be performed in software (such as, e.g., kernel code of an operating system) without requiring any underlying hardware changes. Thread-hopping resolves the difficulty of untangling per-thread resources when transferring just a subset of threads from one core to another core. One reason for this is that, rather than waiting for hardware threads to become idle, embodiments of the thread-hopping mechanism (such as, e.g., that described below in connection with FIGS. 3 and 4) use a software approach to suspend execution of the software thread that is to be evicted to another core. Once suspended, the software thread is mapped to a new logical processor on a different processor core, and the OS scheduler pulls a task for the transferee thread, the task to be performed on the newly-assigned logical processor. This processing is in contrast to traditional OS thread scheduling, which is not triggered by a change in thread C-state and does not involve logical re-mapping of the software thread to a hardware thread context on a different core.

Figure 3:
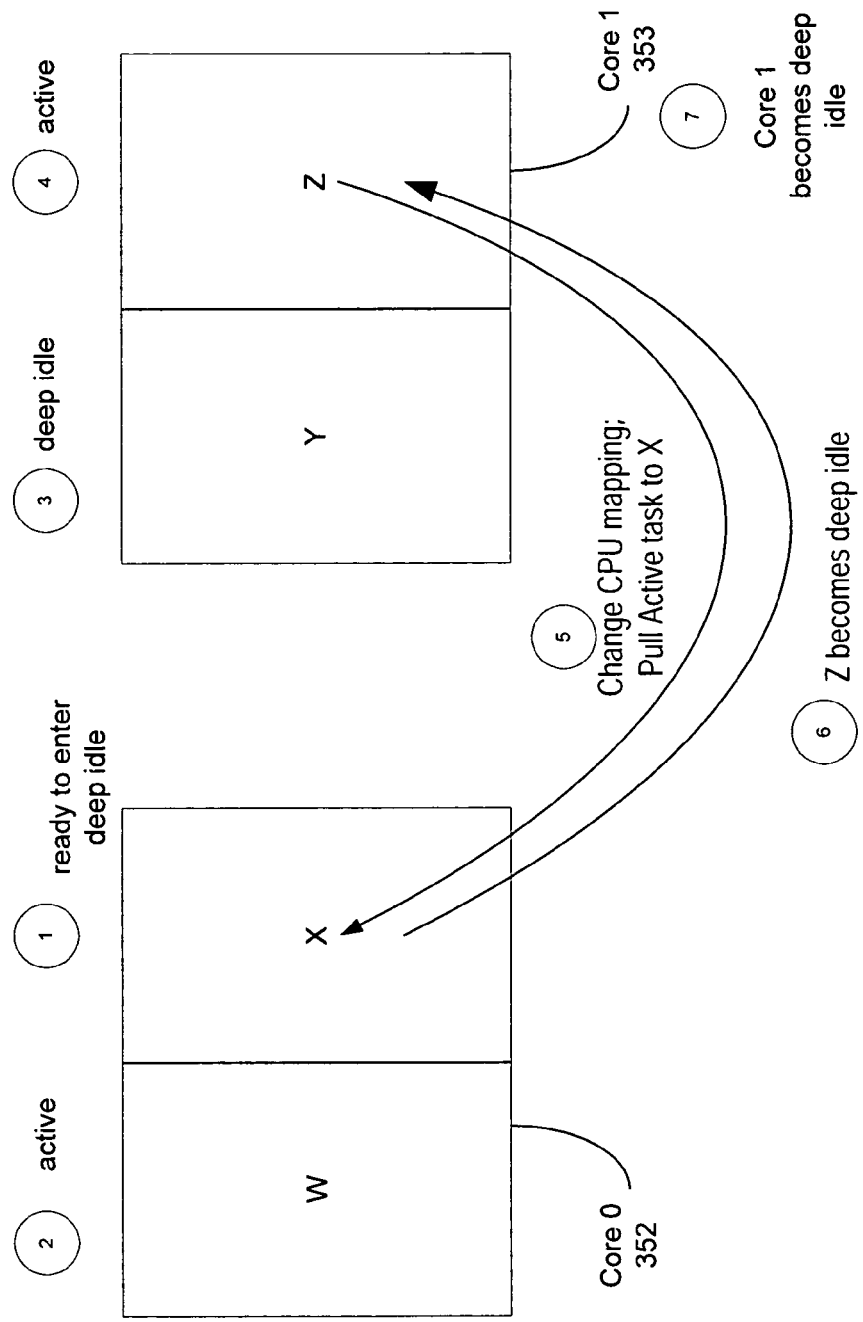
FIG. 3 is a data- and control-flow diagram illustrating at least one embodiment of a method for performing software-based thread-hopping for power savings on a sample system that includes two dual-threaded cores.

FIG. 3 is a data flow diagram that illustrates in further detail the operations of a software-based remapping mechanism according to at least one embodiment. FIG. 3 illustrates that, at operation 1, the OSPM has determined that a hardware thread context ("X") is ready to enter a deep idle state. Before the OS kernel places the hardware thread context into an idle state, it performs processing (discussed in further detail below in connection with FIG. 4) to determine whether it would be more efficient to instead do a software-based task pull to pull the task for some other thread context onto thread context X. This processing includes operation 2, where it is determined whether the sibling hardware thread context(s) on the same core 352 as X is/are in a deep idle state. If not, it might not be efficient, from a power standpoint, to put X in a deep idle state, since the core 352 cannot enter the deep idle state according to current C-state policy unless all of its hardware contexts are idle. As used herein, a "sibling" hardware thread context is meant to refer to the other hardware thread contexts, besides the particular context that is ready to enter deep idle state, on a single core. For embodiments having dual-threaded cores, the number of siblings for any hardware thread context is one. For embodiments having cores with more than 2 hardware thread contexts per core, the number of siblings may be greater than one.

If it is determined at operation 2 that one or more of the sibling thread context(s) for X are not in deep idle state, then the operating system determines whether any other core includes a hardware thread context that is already in a deep idle state. Thus, at operations 3 and 4 the power state of the thread contexts on other cores is evaluated.

For ease of illustration and discussion, FIG. 3 illustrates two cores 352, 353 with two thread contexts per core: W, X for Core 0 and Y, Z for Core 1, respectively. One of skill in the art will recognize, however, that embodiments of the thread-hopping mechanism described herein may be applied to any number of cores having any number of hardware thread contexts each.

At operation 3, it is determined whether any other hardware context on an active core is in a deep idle state. For purposes of example, FIG. 3 illustrates that, at operation 3, it is determined that hardware thread context Y is in a deep idle state. Upon finding a deep idle thread context Y for an active core 353, the power state of one or more other thread contexts on the core 353 is evaluated. In FIG. 3, it is determined at operation 4 that thread context Z is active. Thus, for power savings purposes it would be more efficient to put thread context Z into the deep idle state and pull Z's current task to hardware thread context X.

Accordingly, at operation 5 a remapping is performed. This remapping is performed in software. The OS kernel executes a suspend operation to suspend the task currently being executed on logical processor Z. The logical processors are remapped so that the thread associated with hardware thread context Z is remapped to logical processor X. This remapping includes the transfer of context data for the task being executed by logical processor Z on Core 1 353 to logical processor X on Core 0 352. Execution of the task is then resumed, but on hardware context X instead of Z.

At operation 6, logical processor Z is placed by the OS kernel into a deep idle state. Because all hardware thread contexts for Core 1 are now in the deep idle state, the core 353 enters deep idle state at operation 7.

Figure 4:
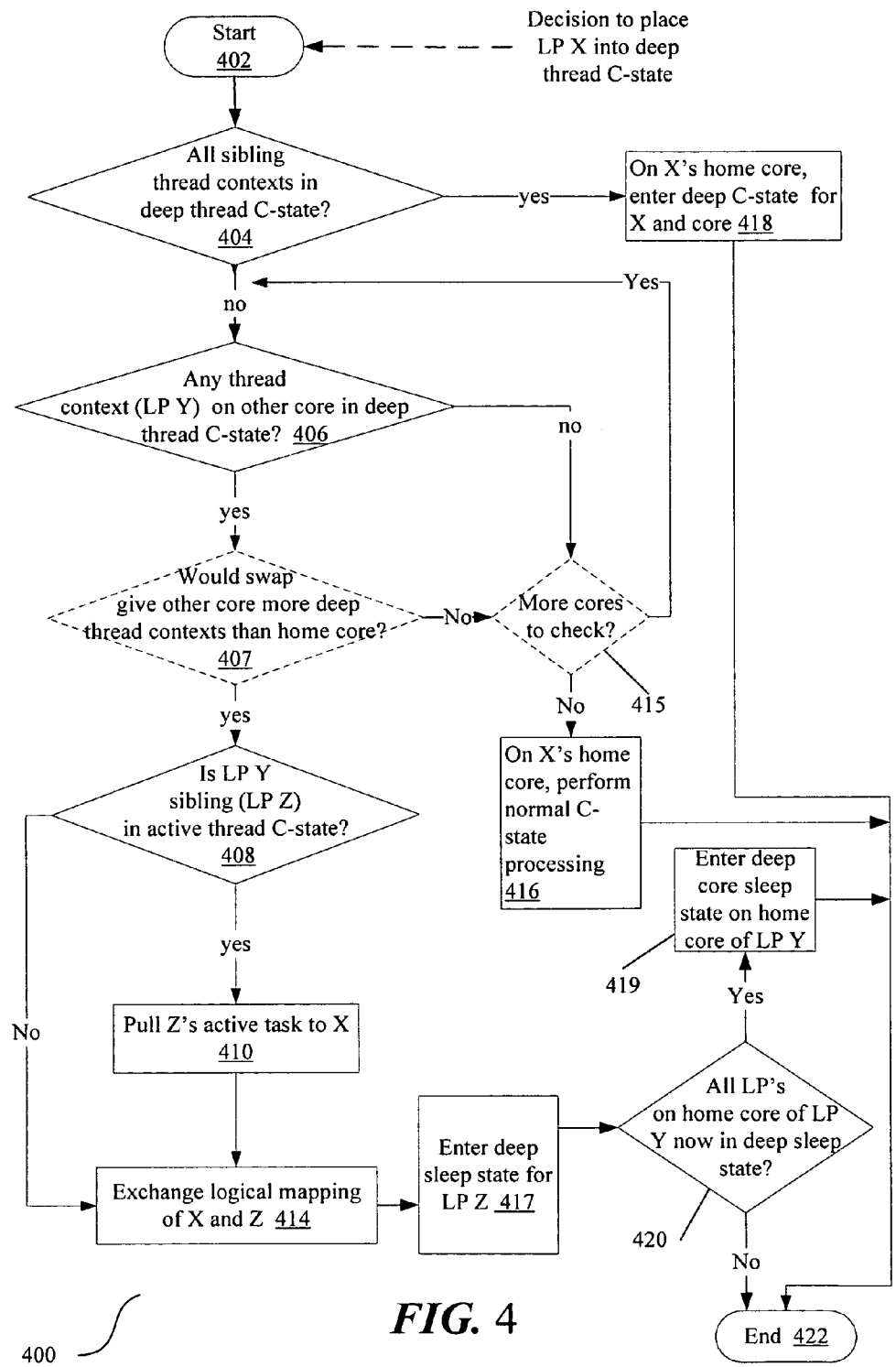
FIG. 4 is a flowchart illustrating at least one embodiment of a method for performing software-based thread-hopping for power savings.

FIG. 4 is a flowchart showing at least one embodiment of a method 400 for performing a swap as illustrated in FIG. 3 and as illustrated in the "After" example of system 250B of FIG. 2. For at least one embodiment, the method 400 illustrated in FIG. 4 may be performed by an OS kernel (see, e.g., 51 of FIG. 1). FIG. 4 illustrates that the method 400 provides for thread-hopping to swap a software task onto a hardware thread context on one core responsive to an impending power state transition of a hardware thread context on another core.

FIG. 4 illustrates that the method 400 begins at start block 402. Start block 402 may be triggered responsive to a determination by the OSPM logic (not shown) of the kernel (e.g., 51 of FIG. 1) that a logical processor (LP X) on one of the cores (Core 0) of a system should be placed into a deep thread C-state.

From start bock 402, processing proceeds to block 404. At block 404, it is determined whether the other hardware thread context(s) on Core 0 are in a deep thread C-state. For an embodiment that has two hardware thread contexts per core, it is determined at block 404 whether the other core is in a deep thread C-state. For all embodiments that includes n hardware thread contexts per core, where n>2, the processing at block 404 determines whether all other hardware thread contexts besides LP X on Core 0 are in a deep thread C-state. If so, no swap is needed and it is appropriate to place the entire core into core deep C-state after placing X into deep thread C-state, and processing proceeds to block 418. Otherwise, processing proceeds to block 406.

At block 406, it has been determined via processing at block 404 that conditions do not exist to place X's home core into deep core C-state. Because power savings benefit could still be achieved if any other core is one thread context shy of deep C-state conditions, it is determined at block 406 whether another core besides Core 0 has a hardware thread context in a deep thread C-state. Of course, other cores that are already in a deep core C-state will have thread contexts in deep thread C-state, so the block 406 evaluation is performed only on cores that are not already in a deep core C-state.

If no thread contexts are identified on another core at block 406, then processing proceeds either to optional block 415 or to block 416, depending on the embodiment. Processing proceeds to optional block 415 for embodiments that include more than two cores in a package. The optional nature of block 415 is denoted by broken lines in FIG. 4. At block 415, it is determined whether there are additional cores to be evaluated for potential threads to be swapped onto LP X. For a dual-core embodiment, block 415 is optional and need not be performed. If it is determined at block 415 that additional cores are to be evaluated, processing proceeds back to block 406. Otherwise, processing proceeds to block 416. At block 416, normal C-state processing occurs—there are no further efficiencies to be gained by thread-hopping.

If, instead, it is determined at block 406 that a hardware thread context (LP Y) on another core (Core 1) is in a deep thread C-state, then processing proceeds either to optional block 407 or to block 408, depending on the embodiment. Processing proceeds to optional block 407 for embodiments that include more than two logical processor per core and proceeds to block 408 for embodiments that include only two logical processors per core. The optional nature of block 407 is denoted in FIG. 4 with broken lines.

At block 407, it is determined whether a swap of work among the two cores would result in the new core having more logical processors in deep idle thread state than Core 0 would have if LP X were placed into deep idle thread state on Core 0. If so, processing proceeds to block 408 in order to continue with swap processing. If not, there are no efficiencies to be gained by the swap, so processing instead proceeds to block either optional block 415 (for embodiments with more than two logical processors per core) or to block 416.

At block 408, it is determined whether any hardware thread context (LP Z) on the other core (Core 1) is in an active state. If so, then the situation exists that a core, other than the home core of LP X, has at least one hardware thread context in a deep c-state and at least one other hardware thread context in an active state. Thus, it would be advantageous, from a power savings standpoint, to consolidate the deep idle hardware thread contexts onto the same core but it is also true that the current work from active LP Z should be pulled to another hardware thread context before LP Z transitions to the deep idle thread C-state. Accordingly, processing proceeds to block 410. If, however, it is determined at block 408 that no siblings on the other core are in an active state, then no task pulling should occur, and processing proceeds to block 414. In this case, the sibling core is either already in a deep thread C-state or some other non-active state (such as, e.g., a C1 shallow idle state).

At block 410, software task pulling is performed. That is, the task that is currently running on LP Z is temporarily suspended and moved to LP X. To do so, a software entity, such as the operating system (and, more particularly, the scheduler of an OS), causes suspension of LP Z's active task. The work associated with LP Z's active task is then assigned to the home core of LP X. The state necessary for LP X to begin executing LP Z's task is moved to the LP X core. The manner of transferring the context state among cores at block 410 is implementation-dependent, and may be performed in any of a variety of manners. For at least one embodiment, for example, the context data from LP Z is copied to an appropriate section of memory or memory hierarchy (e.g., into a cache) to which LP X has access. The instruction pointer is part of the state that gets transferred, so that LP X, when it resumes execution, will begin execution at the next instruction that LP Z would have executed. After the task pull is performed at block 410, operation proceeds to block 414.

At block 414, the logical mapping of LP X and LP Z are swapped by software. That is, the logical CPU ID associated with LP X is swapped to LP Z and, similarly, the logical CPU ID associated with LPZ is swapped to LP X. Operation of the active thread that was formerly running on LP Z is then resumed on LP X. Processing then proceeds to block 417, wherein LP Z enters the deep idle state.

From block 417, processing proceeds to block 420. At block 420 it is determined whether all logical processors on the home core of LP Y are now in deep sleep states. If not, processing ends at block 422.

If it is determined at block 420 that all logical processors for the home core of LP Y are now in a deep thread C-state, then the core enters a deep core C-state. at block 419. Processing then ends at block 422.

Figure 5:
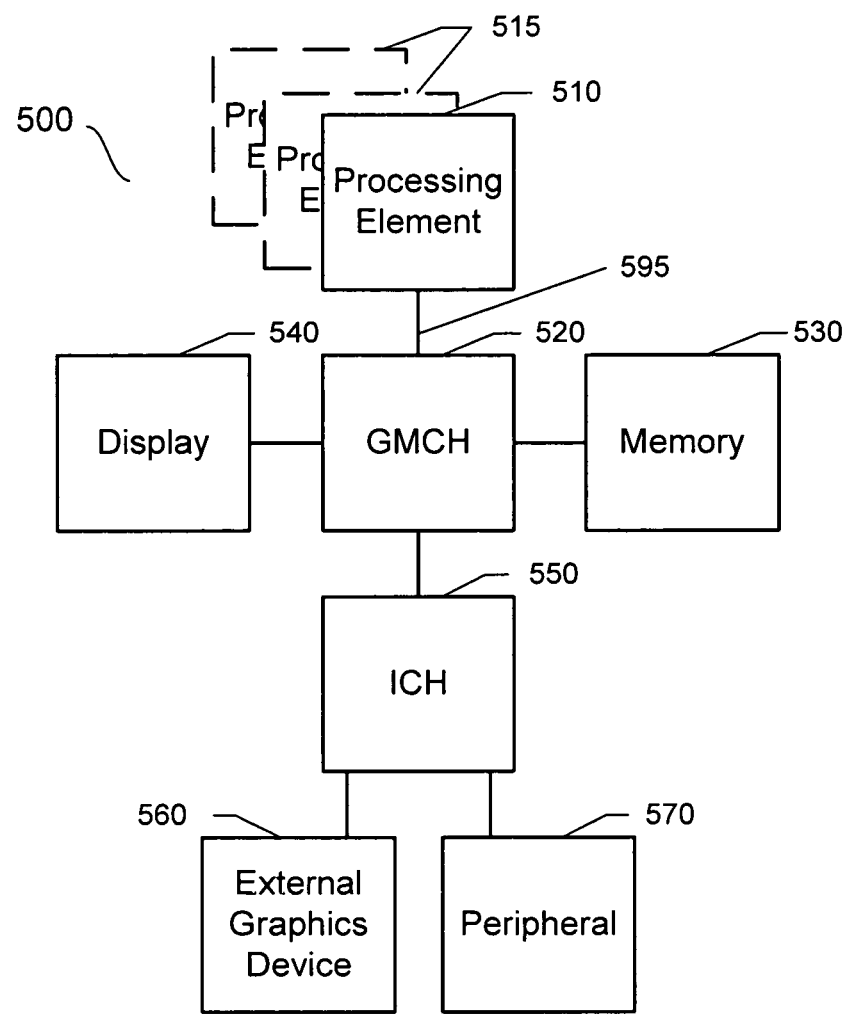
FIG. 5 is a block diagram of a system in accordance with at least one embodiment of the present invention.

Embodiments may be implemented in many different system types. Referring now to FIG. 5, shown is a block diagram of a system 500 in accordance with one embodiment of the present invention. As shown in FIG. 5, the system 500 may include one or more processing elements 510, 515, which are coupled to graphics memory controller hub (GMCH) 520. The optional nature of additional processing elements 515 is denoted in FIG. 5 with broken lines.

Each processing element may be a single core or may, alternatively, include multiple cores. The processing elements may, optionally, include other on-die elements besides processing cores, such as integrated memory controller and/ or integrated I/O control logic. Also, for at least one embodiment, the core(s) of the processing elements may be multithreaded in that they may include more than one hardware thread context per core.

FIG. 5 illustrates that the GMCH 520 may be coupled to a memory 530 that may be, for example, a dynamic random access memory (DRAM). For at least one embodiment, the memory 530 may include instructions or code that comprise an operating system (e.g., 50 of FIG. 1).

The GMCH 520 may be a chipset, or a portion of a chipset. The GMCH 520 may communicate with the processor(s) 510, 515 and control interaction between the processor(s) 510, 515 and memory 530. The GMCH 520 may also act as an accelerated bus interface between the processor(s) 510, 515 and other elements of the system 500. For at least one embodiment, the GMCH 520 communicates with the processor(s) 510, 515 via a multi-drop bus, such as a frontside bus (FSB) 595.

Furthermore, GMCH 520 is coupled to a display 540 (such as a flat panel display). GMCH 520 may include an integrated graphics accelerator. GMCH 520 is further coupled to an input/output (I/O) controller hub (ICH) 550, which may be used to couple various peripheral devices to system 500. Shown for example in the embodiment of FIG. 5 is an external graphics device 560, which may be a discrete graphics device coupled to ICH 550, along with another peripheral device 570.

Alternatively, additional or different processing elements may also be present in the system 500. For example, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

Figure 6:
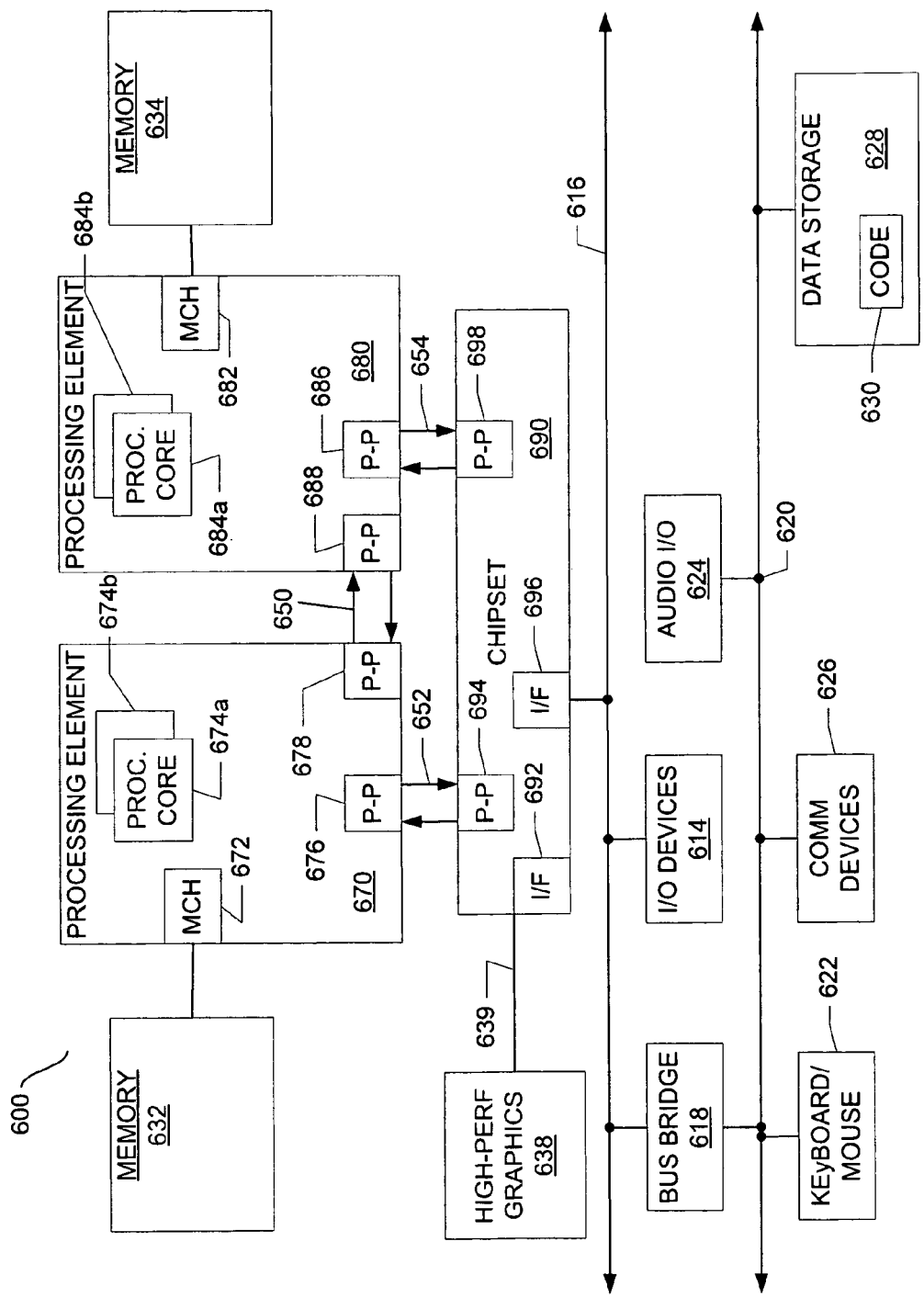
FIG. 6 is a block diagram of a system in accordance with at least one other embodiment of the present invention.

Referring now to FIG. 6, shown is a block diagram of a second system embodiment 600 in accordance with an embodiment of the present invention. As shown in FIG. 6, multiprocessor system 600 is a point-to-point interconnect system, and includes a first processing element 670 and a second processing element 680 coupled via a point-to-point interconnect 650. As shown in FIG. 6, each of processing elements 670 and 680 may be multicore processors, including first and second processor cores (i.e., processor cores 674a and 674b and processor cores 684a and 684b).

Alternatively, one or more of processing elements 670, 680 may be an element other than a processor, such as an accelerator or a field programmable gate array.

While shown with only two processing elements 670, 680, it is to be understood that the scope of the present invention is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. As shown in FIG. 6, MCH's 672 and 682 couple the processors to respective memories, namely a memory 632 and a memory 634, which may be portions of main memory locally attached to the respective processors.

First processing element 670 and second processing element 680 may be coupled to a chipset 690 via P-P interconnects 676, 686 and 684, respectively. As shown in FIG. 6, chipset 690 includes P-P interfaces 694 and 698. Furthermore, chipset 690 includes an interface 692 to couple chipset 690 with a high performance graphics engine 638. In one embodiment, bus 639 may be used to couple graphics engine 648 to chipset 690. Alternately, a point-to-point interconnect 649 may couple these components.

In turn, chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard/mouse 622, communication devices 626 and a data storage unit 628 such as a disk drive or other mass storage device which may include code 630, in one embodiment. The code 630 may include instructions for performing embodiments of one or more of the methods described above. Further, an audio I/O 624 may be coupled to second bus 620. Note that other architectures are possible. For example, instead of the point-to-point architecture of FIG. 6, a system may implement a multi-drop bus or another such architecture.

Figure 7:
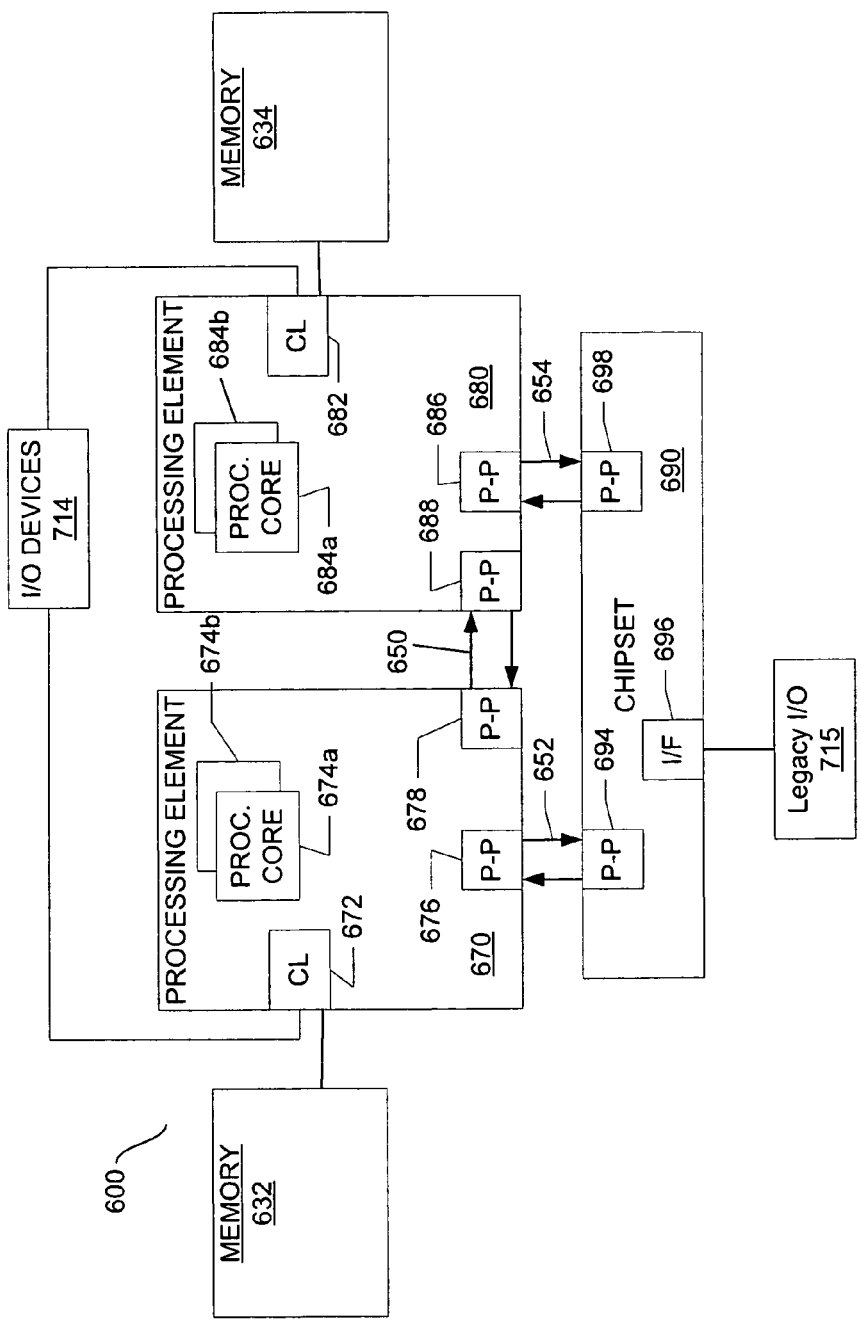
FIG. 7 is a block diagram of a system in accordance with at least one other embodiment of the present invention.

Referring now to FIG. 7, shown is a block diagram of a third system embodiment 700 in accordance with an embodiment of the present invention. Like elements in FIGS. 6 and 7 bear like reference numerals, and certain aspects of FIG. 6 have been omitted from FIG. 7 in order to avoid obscuring other aspects of FIG. 7.

FIG. 7 illustrates that the processing elements 670, 680 may include integrated memory and I/O control logic ("CL") 672 and 682, respectively. For at least one embodiment, the CL 672, 682 may include memory controller hub logic (MCH) such as that described above in connection with FIGS. 5 and 6. In addition. CL 672, 682 may also include I/O control logic. FIG. 7 illustrates that not only are the memories 632, 634 coupled to the CL 672, 682, but also that I/O devices 714 are also coupled to the control logic 672, 682. Legacy I/O devices 715 are coupled to the chipset 690.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 630 illustrated in FIG. 6, may be applied to input data to perform the functions described herein and generate output information. For example, program code 630 may include an operating system that is coded to perform embodiments of the methods illustrated in FIGS. 2, 3 and 4. Accordingly, embodiments of the invention also include media that are machine-accessible and computer usable, the media containing instructions for performing the operations of a method or containing design data, such as HDL, which defines structures, circuits, apparatuses, processors and/or system features described herein. Such embodiments may also be referred to as computer program products.

Such machine-accessible, computer-usable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of computer-usable media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods, apparatuses, and systems for remapping thread units and re-assigning work among threads on different cores to consolidate idle threads onto the same core. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:
   in response to an operating system power management determining to place a first thread unit of a first processor core into a deep idle state, obtaining power state of a second thread unit of the first processor core;
   in response to the power state of the second thread unit of the first processor core not in the deep idle state, obtaining power states of a first thread unit and a second thread unit of a second processor core;
   in response to the power state of the second thread unit of the second processor core in the deep idle state, and the first thread unit of the second processor core not in the deep idle state, swapping work from the first thread unit of the second processor core to the first thread unit of the first processor core;
   after the swapping, changing the power state of the first thread unit of the second processor core to the deep idle state; and
   after the changing, changing the core power state of the second processor core.

2. The method of claim 1, wherein said swapping is performed by control software of a computing platform comprising the first and second processor cores.

3. The method of claim 2, wherein said swapping is performed by an operating system of the computing platform.

4. The method of claim 2, wherein said swapping comprises performing a software-based context switch.

5. The method of claim 1, wherein said first and second processor cores reside in the same die package.

6. The method of claim 1, wherein said swapping comprises remapping a thread identifier of the first thread unit of the second processor core to the first thread unit of the first processor core.

7. A system comprising:
   a chip package comprising a first processor that includes a plurality of thread units, and a second processor that includes a plurality of thread units;
   a power module that is at least communicatively coupled with the chip package to determine, in response to a determination of an operating system power management to place a first thread unit of a first processor core into a deep idle state, whether a second thread unit of the first processor core is in the deep idle state, and in response to a determination that the second thread unit of the first processor core in not in the deep idle state, determine whether a first thread unit of a second processor core is not in the deep idle state and a second thread unit of the second processor core is in the deep idle state; and a scheduler module that is at least communicatively coupled to the chip package and the power module to respond to the responsive determination that the first thread unit of the second processor core is not in the deep idle state and the second thread unit of the second processor core is in the deep idle state, to swap work from the first thread unit of the second processor core to the first thread unit of the first processor core.

8. The system of claim 7, wherein said power module is further to change the power state of the first thread unit of the second processor core to the deep idle state, after the scheduler module performed said swap work.

9. The system of claim 7, wherein said power module is further to change the processor power state of the second processor core, after the power state of the first thread unit of the second processor core has been changed to the deep idle state.

10. The system of claim 7, wherein said scheduler module and said power module are software modules.

11. The system of claim 7, wherein the processor cores reside on the same die package.

12. The system of claim 7, wherein said first and second processor cores are members of a processing element having an integrated memory controller.

13. A computer program product, comprising a non-transitory computer usable medium having a computer readable program code embodied therein, said computer readable program code adapted to be executed to implement a method, said method comprising:

in response to an operating system power management determining to place a first thread unit of a first processor core into a deep idle state, obtaining power state of a second thread unit of a first processor core;

in response to the power state of the second thread unit of the first processor core not in the deep idle state, obtaining power states of a first thread unit and a second thread unit of a second processor core;

in response to the power state of the second thread unit of the second processor core in the deep idle state, and the first thread unit of the second processor core not in the deep idle state, swapping work from the first thread unit of the second processor core to the first thread unit of the first processor core;

after the swapping, changing the power state of the first thread unit of the first processor core to the deep idle state; and after the changing, changing the core power state of the first processor core.

14. The product of claim 13, wherein said swapping comprises performing a software-based context switch.

15. The product of claim 13, wherein said first and second processor cores reside in the same die package.

16. The product of claim 13, wherein said swapping further comprises remapping a thread identifier of the first thread unit of the second processor core to the first thread unit of the first processor core.

* * * * *